US008060445B2

(12) United States Patent
Chatte et al.

(10) Patent No.: US 8,060,445 B2
(45) Date of Patent: Nov. 15, 2011

(54) FRANKING SYSTEM WITH DISTRIBUTED METERING

(75) Inventors: Fabien Chatte, Nogent sur Marne (FR); Marek Krasuski, Fontenay Aux Roses (FR)

(73) Assignee: Neopost Technologies, Bagneux (FR)

( * ) Notice: Subject to any disclaimer, the term of this patent is extended or adjusted under 35 U.S.C. 154(b) by 484 days.

(21) Appl. No.: 11/468,416

(22) Filed: Aug. 30, 2006

(65) Prior Publication Data

US 2007/0100769 A1 May 3, 2007

(30) Foreign Application Priority Data

Aug. 31, 2005 (FR) ...................................... 05 08912

(51) Int. Cl.

| | |
|---|---|
| ***G06Q 20/00*** | (2006.01) |
| *G06F 12/14* | (2006.01) |
| *G06F 12/16* | (2006.01) |
| *G06F 9/00* | (2006.01) |
| *G06F 17/00* | (2006.01) |
| *G07B 17/02* | (2006.01) |
| *B65B 35/00* | (2006.01) |

(52) U.S. Cl. .......... 705/60; 705/402; 705/403; 705/404; 705/405; 705/406; 705/410; 705/61

(58) Field of Classification Search ........................ None
See application file for complete search history.

(56) References Cited

U.S. PATENT DOCUMENTS

| | | | | |
|---|---|---|---|---|
| 5,812,666 | A * | 9/1998 | Baker et al. | 380/277 |
| 5,822,738 | A | 10/1998 | Shah et al. | |
| 6,081,795 | A * | 6/2000 | Ryan, Jr. | 705/408 |
| 6,202,057 | B1 * | 3/2001 | Pierce | 705/408 |
| 6,233,565 | B1 * | 5/2001 | Lewis et al. | 705/35 |
| 2002/0178354 | A1 * | 11/2002 | Ogg et al. | 713/155 |

FOREIGN PATENT DOCUMENTS

| | | | |
|---|---|---|---|
| EP | 0 927 958 | A2 | 7/1999 |
| WO | WO 01/50227 | A2 | 7/2001 |

* cited by examiner

*Primary Examiner* — John Hayes
*Assistant Examiner* — George Chen
(74) *Attorney, Agent, or Firm* — Sughrue Mion, PLLC

(57) ABSTRACT

In a mail franking system including a central secure metering device (PSD 20) connected to a remote credit reloading server (26) and a plurality of local franking management modules (22-1 to 22-N) each including a local secure metering device (28-1 to 28-N) and connected to said central secure metering device via a user's local area network (LAN), there is provided a method wherein a franking session is opened, each of the local franking management modules books a predetermined franking value from a central secure metering device so as to perform secure frankings up to the limit of this value and at the end of session each of these modules transmits its consumed franking value to the central device which is then debited by an overall franking value equal to the sum of the franking values consumed by each of the local modules.

7 Claims, 4 Drawing Sheets

FRANKING SYSTEM WITH DISTRIBUTED METERING

TECHNICAL FIELD

The present invention relates exclusively to the field of mail processing and concerns more particularly a franking system the deployment of which is made easier.

PRIOR ART

Today, as illustrated in FIG. 3, when a user wishes to deploy several franking machines 2-1 to 2-N, optionally located at different places on the operating site, the user has to credit each of these machines by accessing the server 6 of the operator of these machines via an individual modem 4-1 to 4-N and an external communications network 8, which obliges the user to tie up large sums of money.

This problem is avoided in open franking systems of the type described in U.S. Pat. No. 5,822,738 filed by the applicant and illustrated in FIG. 4, in which the printing of postmarks performed by standard printers 12-1 to 12-N connected to general purpose computers 14-1 to 14-N can be accomplished remotely from a single secure metering device 10 (also known by the designations SMD for Secure Metering Device or PSD for Postal Security Device) to which the computers are connected via the user's local area network 4 and which is then the only device that needs to be credited from the server 6 of the operator of this device.

However, such a system is not without drawbacks. Firstly, it is not possible to achieve high printing rates because the PSD which has the task of managing the security of exchanges in the system must be able to simultaneously compute and sign the postmarks of all the printers that are attached to it. Moreover, it is very difficult to calibrate the necessary computing capacity of the PSD and therefore to be able to produce, as is desirable, a secure metering device with a single capacity, as this capacity will differ greatly depending on whether this PSD is connected, for example, to 2 printers handling 5,000 mail items per hour or to 30 printers handling 18,000 mail items per hour. Also, the transmission between the secure metering device and the standard printers engaged in printing the postmarks, or at least the dynamic portion thereof (the part that is modified at each printing), must necessarily take place in real time, which, when the franking throughput reaches a certain level, calls for the use of a network dedicated solely to franking communications in which the throughput, transmission and access times can then be fully controlled.

The use of an independent network is particularly costly and therefore there is currently a need for a solution enabling the resources of the user's network to be utilised directly.

DISCLOSURE OF THE INVENTION

The object of the present invention is, therefore, to overcome the abovementioned drawbacks by proposing a novel method of franking mail items in a mail franking system including a central secure metering device connected to a remote credit reloading server and a plurality of local franking management modules each including a local secure metering device and connected to said central secure metering device via a user's local area network, characterised in that it includes the following steps: opening of a franking session, booking by each of the local franking management modules of a predetermined franking value from a central secure metering device, secure franking of mail items by each of the local franking management modules up to the limit of this pre-booked predetermined franking value, at the end of the session transmittal to the central secure metering device by each of the local franking management modules of the franking value consumed during the session and statistics relating to the corresponding frankings, and debiting in the central secure metering device of an overall franking value equal to the sum of the franking values consumed by each of the local franking management modules.

Thus, by distributing the means of metering and reloading credit between a central PSD and the local PSDs, it becomes possible to limit the sums of money tied up and to eliminate the drawbacks of networking by providing local printing in real time.

Advantageously, provision is made for a step involving the transmittal by the central secure metering device of a temporary session key to each of the local franking management modules in response to their request to book a predetermined franking value and a step involving the destruction of the temporary session key at the end of the session.

Preferably, if said franking value consumed at the end of the session is less than the booked value, the difference is released for re-allocation to another local secure metering device.

Advantageously, provision is made for a step involving the booking of a new franking value at the central secure metering device when the predetermined franking value previously booked is depleted before the end of the session. Preferably, the step involving the booking of a new franking value is preceded by a step involving the transmittal of statistical data relating to the frankings completed and it is initiated if the remaining franking value is less than a predetermined value corresponding at most to several additional printings.

BRIEF DESCRIPTION OF THE FIGURES

Other characteristics and advantages of the present invention will become more clearly apparent from the following description, provided for information and non-limitative regarding the invention, with reference to the attached drawings, in which.

EMBODIMENT(S) OF THE INVENTION

Figure 1:
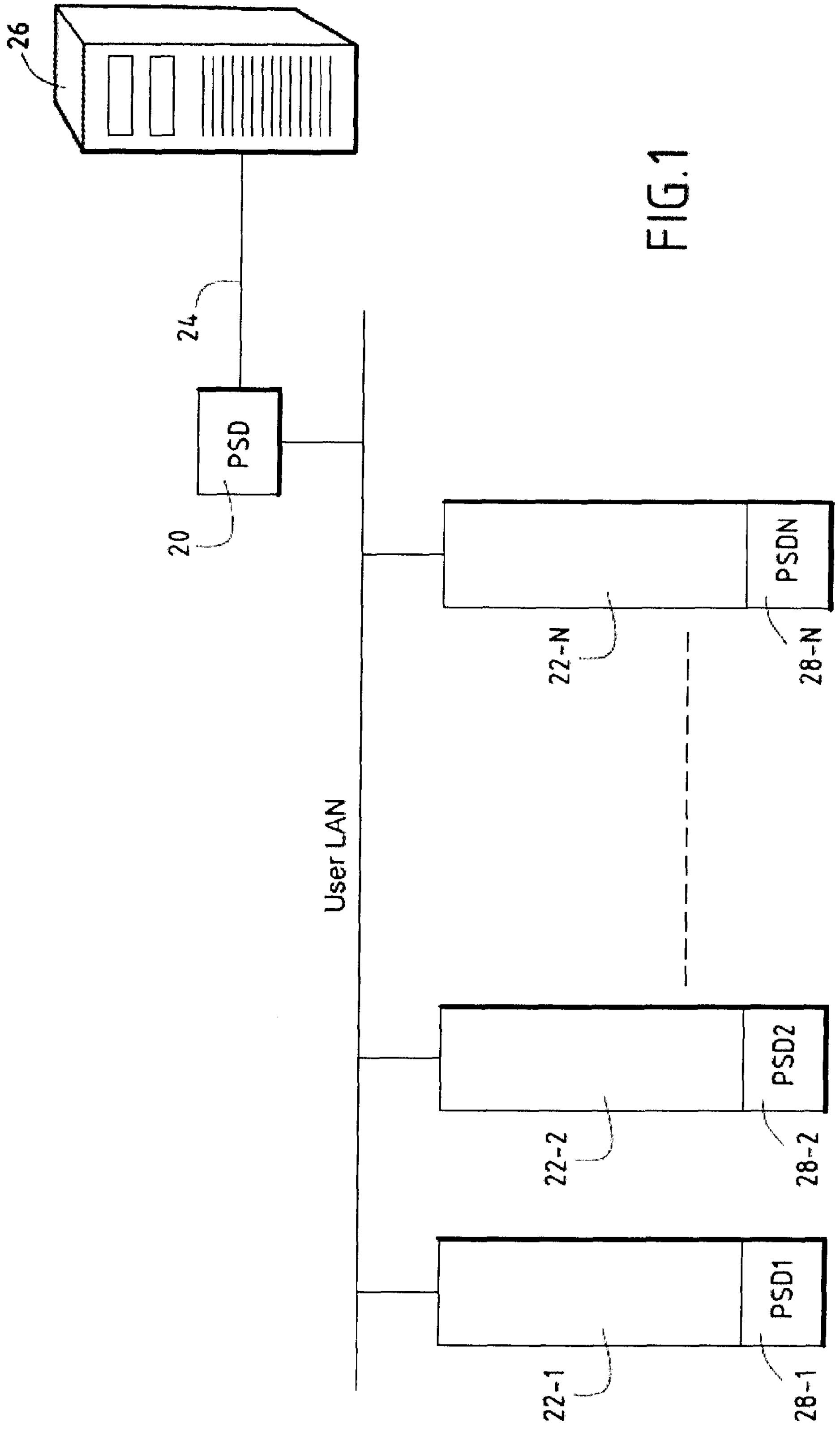
FIG. 1 illustrates an example of a franking system according to the invention.

An example of a franking system enabling the invention to be carried out is illustrated in FIG. 1. This comprises a modular franking system built around a user's local area network (LAN) to which are connected, on the one hand, a secure postage metering device 20 (PSD) and, on the other hand, different franking management modules 22-1 to 22-N for the printing of postmarks. These franking management modules can be general purpose computers each connected to a standard printer, or franking machines having a simplified mode of operation as will be described below. The PSD can, as illustrated, be directly connected to the network but it can also be connected to the network via an administration computer (not shown) or can be integrated with this computer. It can also be integrated in a conventional manner with a traditional franking machine (not shown).

To facilitate reloading of the metering device and statistical monitoring of frankings completed by the different franking management modules of the system, the PSD taken in isolation or that integrated with the traditional franking machine or with the administration computer if any, is connected via a dedicated link 24 (or via a communications network not shown) to a remote management server 26 operated by the franking system operator or postal authority.

Figure 4:
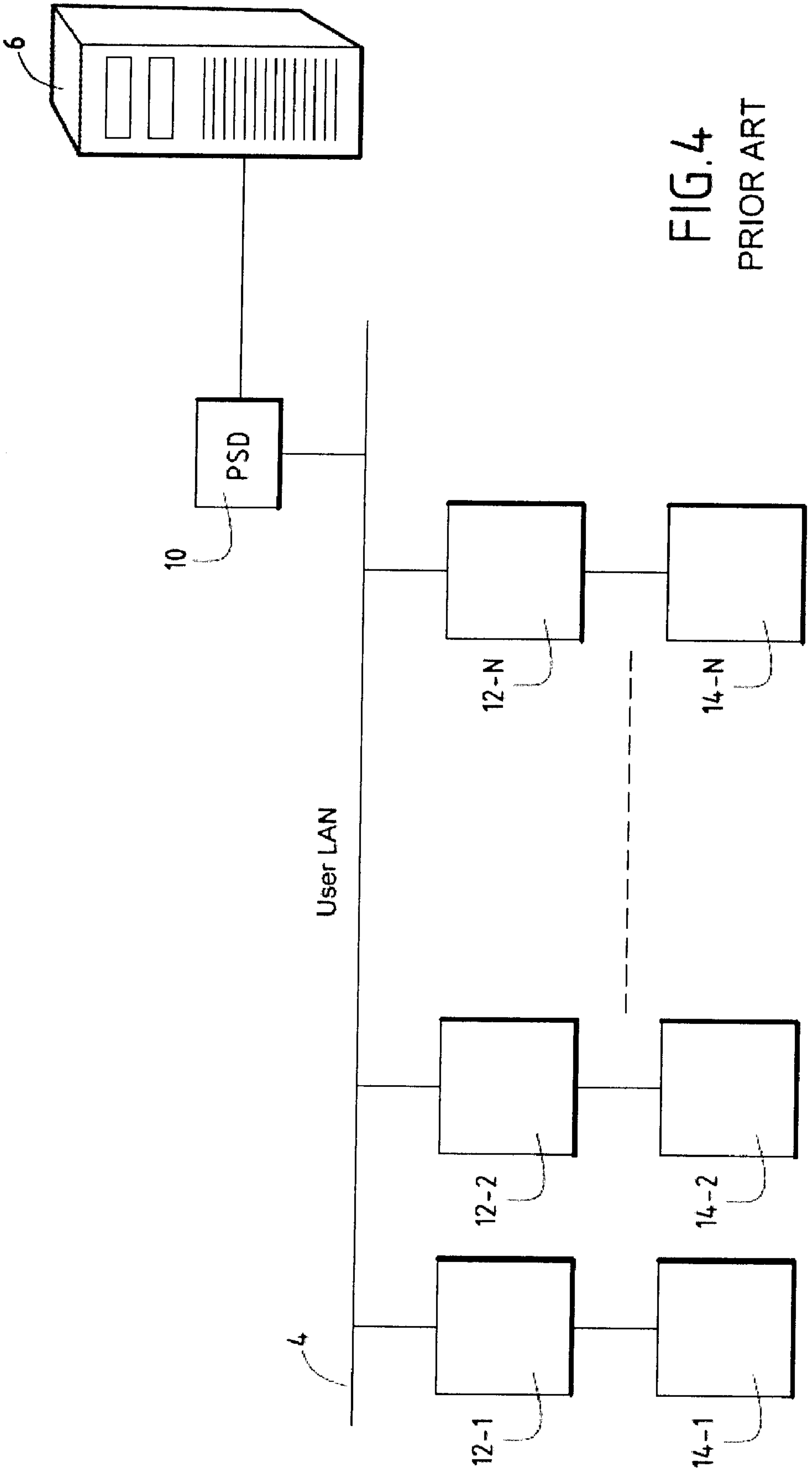
FIG. 4 PRIOR ART
FIG. 4 illustrates a second example of a franking system of the prior art.

According to the invention, in order to avoid the problems of computing capacity and communication of franking data on the user's network posed by the franking system in FIG. 4 and to avoid the problem of tying up unduly large sums of money posed by the franking system in FIG. 5, it is provided that the PSD 20 referred to as the central PSD is assisted by local PSDs 28-1 to 28-N each associated with franking management modules 22-1 to 22-N.

The central PSD performs all of the functions traditionally associated with such a metering device, i.e.:

counting of franking values (management of up-counters, down-counters and cumulative value counters), storage and communication of postal statistics including the various errors detected (management of faults register) relating to frankings completed, and downloading of reconfiguration data and credit reloading from the remote management server.

However, the generation of secure postmarks (encrypted or signed) by means of an encryption algorithm is no longer a function of this central PSD but of the local PSDs which, for this generation function, will receive from the central PSD temporary single-use keys, referred to as session keys, generated in the central PSD.

Similarly, this central PSD will be provided with an additional credit booking function which will be able, up to the credit limit assigned by the remote management server, to allocate to each local PSD an overall franking value to enable the franking management module associated therewith to print postmarks up to the limit of this overall value.

The essential role of each local PSD will be to generate secure postmarks from the temporary key received from the central PSD and to prepare postal statistics which will then be communicated to this central PSD for storage. It does not have the data downloading, reconfiguration and credit reloading functions which are performed only at the central PSD and its metering function is confined to the management of a single down-counter initially loaded with the franking value booked at the central PSD and decremented as the frankings are completed.

Figure 2:
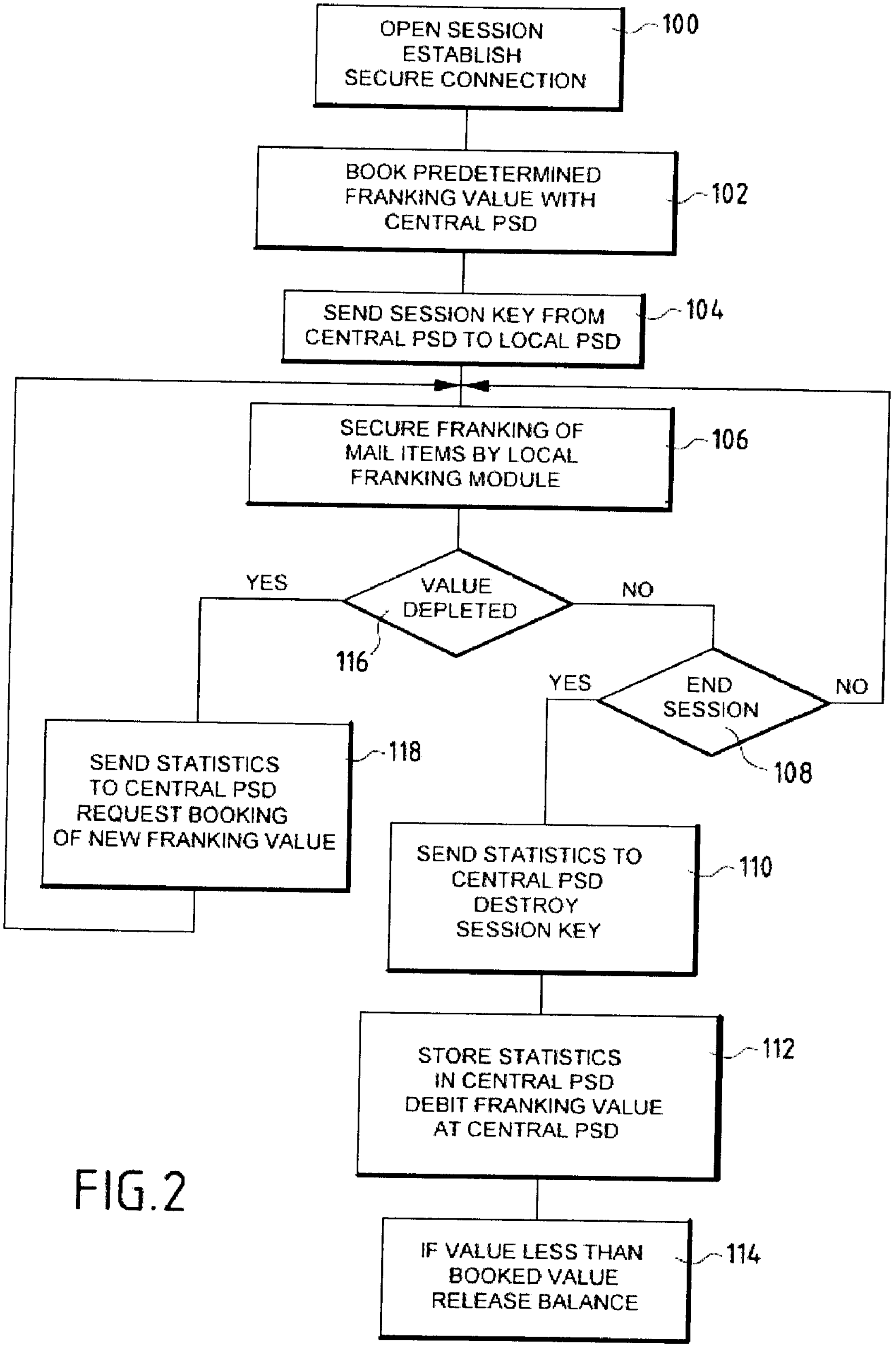
FIG. 2 illustrates the different steps of the method implemented in the system in FIG. 1.
Figure 3:
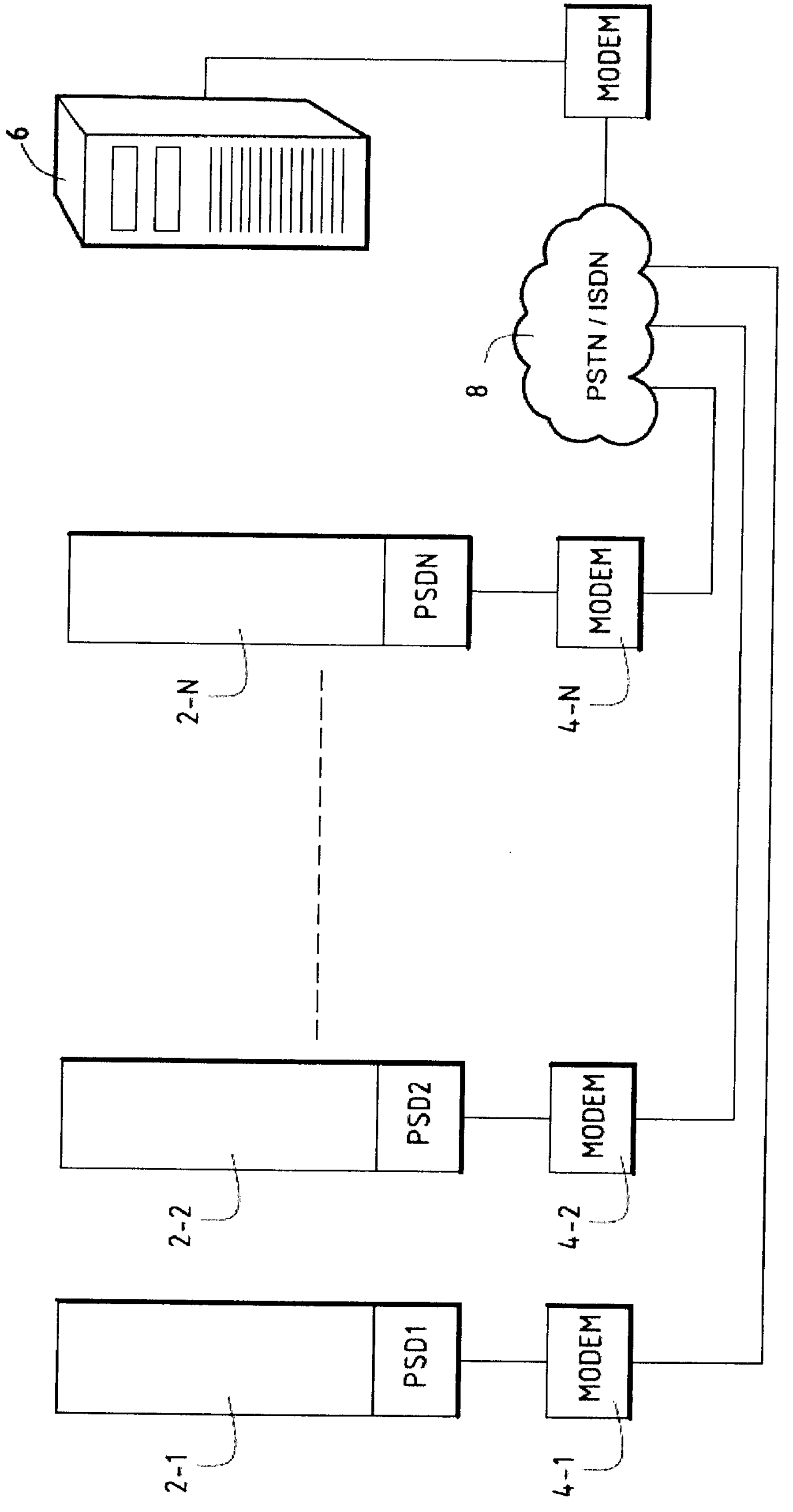
FIG.3 PRIOR ART
FIG. 3 illustrates a first example of a franking system of the prior art.

The operation of the franking system will now be described with reference to the block diagram in FIG. 2 which shows the different steps required to complete a franking.

Following the launch of the franking management module, the first step 100 comprises the automatic opening of a session the object of which is to establish an authenticated and secure connection (SSL protocol) between the local PSD of the franking management module and the central PSD for the purpose of booking a predetermined franking value at the central PSD in a following step 102. Thus, when a user wishes to frank a batch of mail items, he/she must first book (this booking may also be made automatically when the session is opened) a predetermined franking value corresponding to the number of frankings that he/she expects to complete during the session. Once this value has been booked, the central PSD will send a temporary key (session key) at a step 104, enabling the local PSD once this key has been received to sign its postmarks at a next step 106. The franking process can then proceed conventionally up to the limit of the booked franking value. At the end of the session (test at step 108), for example in the middle of the day or at the end of the day, the local PSD will send to the central PSD at a step 110 the detailed statistics relating to the frankings completed and will destroy the temporary key received at the start of the session. On receiving this data, the central PSD will at a step 112 store these postal statistics in its secure memory and will debit its postal credit by the overall franking value of the session corresponding to the sum of the franking values consumed by each of the local franking management modules. If this value is less than the booked value, the difference corresponding to the remaining balance is released and may, therefore, be reallocated to another local PSD at step 114. Thus, the amount initially booked for a given franking management module cannot be assigned to another module.

During the session, if the booked amount is nearly depleted and therefore close to being reached (test at step 116), that is to say, if the remaining franking value is less than the value allowing several additional printings to be made, for example the next two printings, the local PSD will then transmit at a step 118 a statement of frankings completed to the central PSD with a request to book a new franking value. This margin is necessary to ensure a continuous franking process (that is to say without interruption during booking), given that the franking system of the invention is not a real-time system, booking can take several seconds, and particularly if the network is busy, it may be necessary to re-send the request several times before it reaches the central PSD. Furthermore, when several franking management modules simultaneously request a new booking, it is necessary to queue these requests and the response is not then immediate.

Thus, the invention brings numerous advantages to the franking process deploying networked franking management modules. The use of a local PSD to compute the postmark facilitates real-time processing of printing and limits the computing capacity required. The use of a central PSD enables the user to be credited at a single location at which all of the franking statistics relating to all the franking management modules are additionally available.

The invention claimed is:

1. Method of franking mail items in a mail franking System of a user method comprising the following steps:

opening of a franking session by establishing a secure connection through a user's local area network between local secure metering devices of a plurality of local franking management modules of the user and a central secure metering device of the user connected to a remote credit reloading server of a mail franking system operator, booking by each of the local secure metering devices of a predetermined franking value from said central secure metering device, transmitting by the central secure metering device a temporary session key to each of the local secure metering devices;

secure franking of mail items by each of the local franking management modules up to the limit of this pre-booked predetermined franking value, at the end of the session, transmitting to the central secure metering device by each of the local secure metering devices the franking value consumed during the session and statistics relating to the corresponding frankings, and debiting in the central secure metering device of an overall franking value equal to the sum of the franking values consumed by each of the local franking management modules.

2. Method according to claim 1, further comprising a step of booking of a new franking value at the central secure metering device prior to the depletion of the predetermined franking value previously booked.

3. Method according to claim 2, wherein the step of booking a new franking value is initiated if the remaining franking value is less than a predetermined value.

4. Method according to claim 2, wherein the step of booking a new franking value is preceded by a step involving the transmittal of statistics relating to the frankings completed.

5. Method according to claim 1, further comprising a step of transmitting by the central secure metering device a temporary session key to each of the local franking management modules in response to their request to book a predetermined franking value.

6. Method according to claim 5, further comprising a step of destroying the temporary session key at the end of the session.

7. Method according to claim 1, wherein if said franking value consumed at the end of the session is less than the booked value, the difference is released for reallocation to another local secure metering device.

* * * * *